United States Patent
Dale et al.

(10) Patent No.: US 9,488,294 B1
(45) Date of Patent: Nov. 8, 2016

(54) WATER HOSE SUPPORT DEVICE

(71) Applicants: Randall Curtis Dale, Champlin, MN (US); Brenda Lee Dale, Champlin, MN (US); Nathaniel Curtis Dale, Champlin, MN (US)

(72) Inventors: Randall Curtis Dale, Champlin, MN (US); Brenda Lee Dale, Champlin, MN (US); Nathaniel Curtis Dale, Champlin, MN (US)

( * ) Notice: Subject to any disclaimer, the term of this patent is extended or adjusted under 35 U.S.C. 154(b) by 0 days.

(21) Appl. No.: 14/678,207

(22) Filed: Apr. 3, 2015

(51) Int. Cl.
| | |
|---|---|
| B05B 15/06 | (2006.01) |
| F16L 3/00 | (2006.01) |
| F16L 3/123 | (2006.01) |
| F16L 3/127 | (2006.01) |
| A62C 33/04 | (2006.01) |

(52) U.S. Cl.
CPC .............. *F16L 3/003* (2013.01); *A62C 33/04* (2013.01); *B05B 15/06* (2013.01); *F16L 3/123* (2013.01); *F16L 3/127* (2013.01)

(58) Field of Classification Search
CPC ......... F16L 3/003; F16L 3/123; F16L 3/127; F16L 3/26; E03C 1/06; A62C 31/28; A62C 33/04; B02B 15/06
USPC .............................................. 248/75, 79, 80
See application file for complete search history.

(56) References Cited

U.S. PATENT DOCUMENTS

| | | | | |
|---|---|---|---|---|
| 1,192,313 | A * | 7/1916 | Howell | B05B 15/063 248/81 |
| 1,566,232 | A * | 12/1925 | Schreiter | B05B 15/062 239/276 |
| 1,988,159 | A * | 1/1935 | Burgess | B05B 15/063 248/80 |
| 2,819,115 | A * | 1/1958 | Arnold | B05B 15/062 239/276 |
| 3,056,571 | A * | 10/1962 | Thomas | A62C 33/04 24/19 |
| 3,730,228 | A * | 5/1973 | Gibbs, Sr. | E03F 1/008 138/106 |
| 6,015,098 | A * | 1/2000 | Krueger | B05B 1/207 239/261 |
| 8,286,892 | B1 * | 10/2012 | Schwanebek | B05B 15/062 239/1 |
| 8,286,925 | B1 * | 10/2012 | White, Jr. | A47G 29/1216 248/156 |
| 8,632,037 | B1 * | 1/2014 | Rael | F16L 3/003 248/534 |
| 9,175,790 | B2 * | 11/2015 | Schiller | F16L 3/02 |
| 2005/0184203 | A1 * | 8/2005 | Votypka | B05B 15/066 248/87 |

* cited by examiner

*Primary Examiner* — Anita M King
(74) *Attorney, Agent, or Firm* — Dave Alan Lingbeck

(57) ABSTRACT

A water hose support device for standing up the nozzle of the water hose for easy accessibility. The water hose support device includes a base assembly, and a hose support assembly including an rigid elongate tubular member having open top and bottom ends and a bore extending therethrough with the elongate tubular member rotatably mounted upon the base assembly and adapted to removably receive and support a water hose therethrough.

3 Claims, 3 Drawing Sheets

WATER HOSE SUPPORT DEVICE

BACKGROUND OF THE INVENTION

1. Field of the Invention

The present invention relates to hose supports and more particularly pertains to a new water hose support device for standing up the nozzle of the water hose for easy accessibility.

2. Description of the Prior Art

The use of hose supports is known in the prior art. More specifically, hose supports heretofore devised and utilized are known to consist basically of familiar, expected and obvious structural configurations, notwithstanding the myriad of designs encompassed by the crowded prior art which have been developed for the fulfillment of countless objectives and requirements.

The prior art includes a support for holding a hose and nozzle with the support comprising a tubular member and a frame supporting the tubular member with the hose disposed through the tubular member and the nozzle exposed outside the tubular member. Another prior art includes a water hose support having a base, an upright support member, and hose holder. Also, another prior art describes a support member and a conduit attached to the support member for supporting a hose. While these devices fulfill their respective, particular objectives and requirements, the aforementioned patents do not disclose a new water hose support device.

SUMMARY OF THE INVENTION

The general purpose of the present invention, which will be described subsequently in greater detail, is to provide a new water hose support device which has many of the advantages of the hose supports mentioned heretofore and many novel features that result in a new water hose support device which is not anticipated, rendered obvious, suggested, or even implied by any of the prior art hose supports, either alone or in any combination thereof. The present invention includes a base assembly, and a hose support assembly including an rigid elongate tubular member having open top and bottom ends and a bore extending therethrough with the elongate tubular member rotatably mounted upon the base assembly and adapted to removably receive and support a water hose therethrough. None of the prior art includes the combination of the elements of the present invention.

There has thus been outlined, rather broadly, the more important features of the water hose support device in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new water hose support device which has many of the advantages of the hose supports mentioned heretofore and many novel features that result in a new water hose support device which is not anticipated, rendered obvious, suggested, or even implied by any of the prior art hose supports, either alone or in any combination thereof.

Still another object of the present invention is to provide a new water hose support device for standing up the nozzle of the water hose for easy accessibility.

Still yet another object of the present invention is to provide a new water hose support device that allows the user to pick up the nozzle or dispensing end of the water hose without having to stoop to do so.

Even still another object of the present invention is to provide a new water hose support device that allows the user to water plants and shrubbery and to hold and spray water up high.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
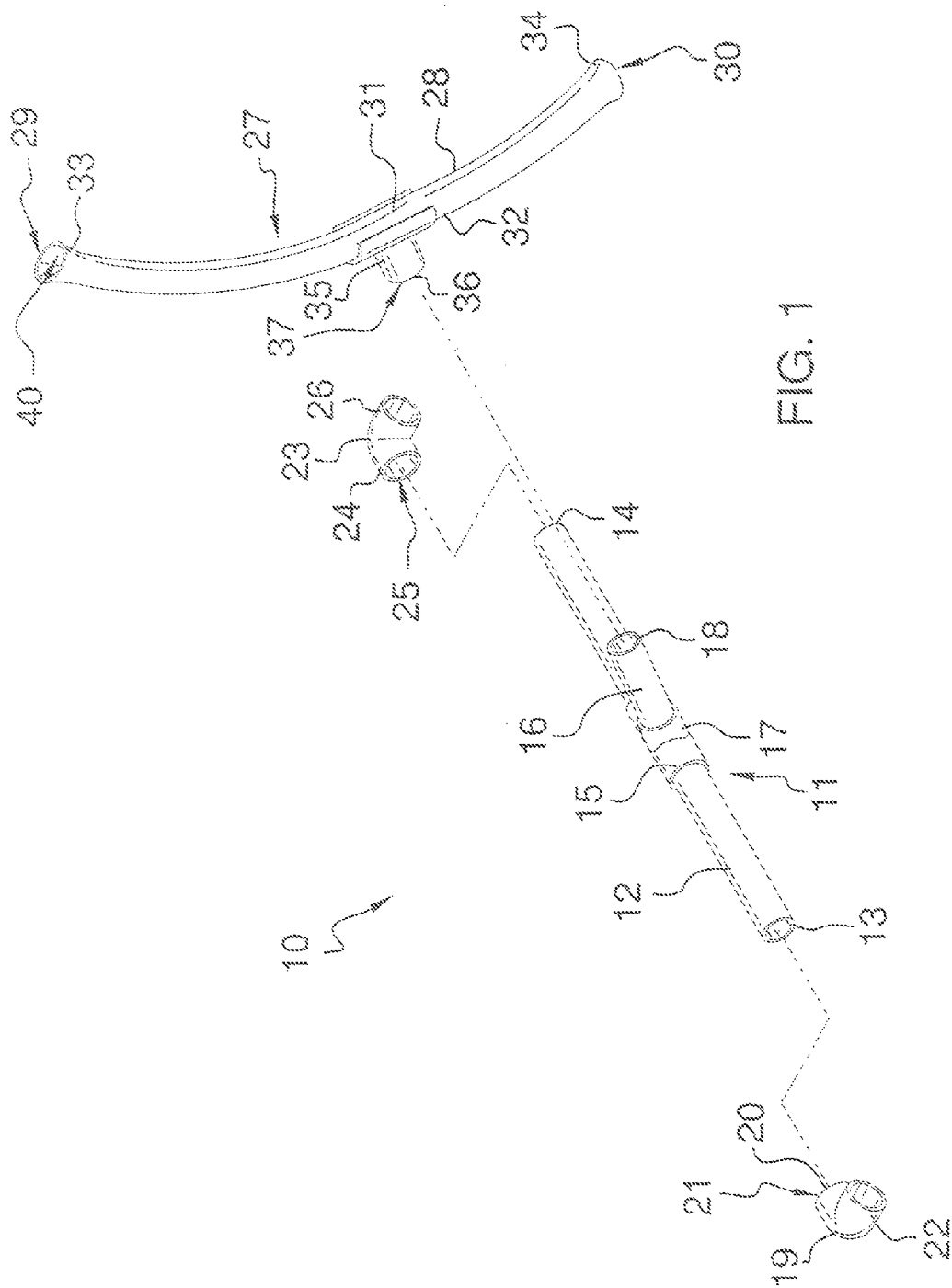
FIG. 1 is an exploded perspective view of a new water hose support device according to the present invention.
Figure 2:
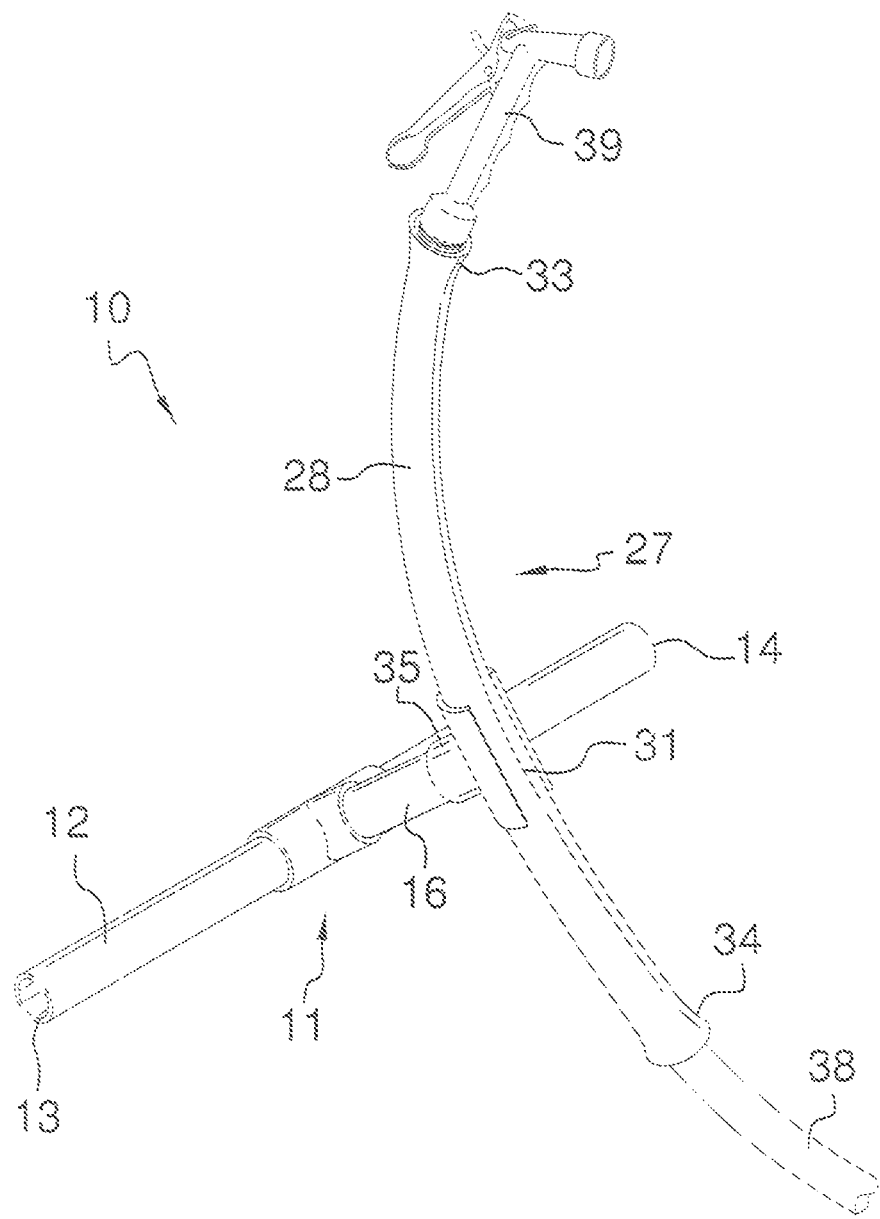
FIG. 2 is a perspective view of the present invention.
Figure 3:
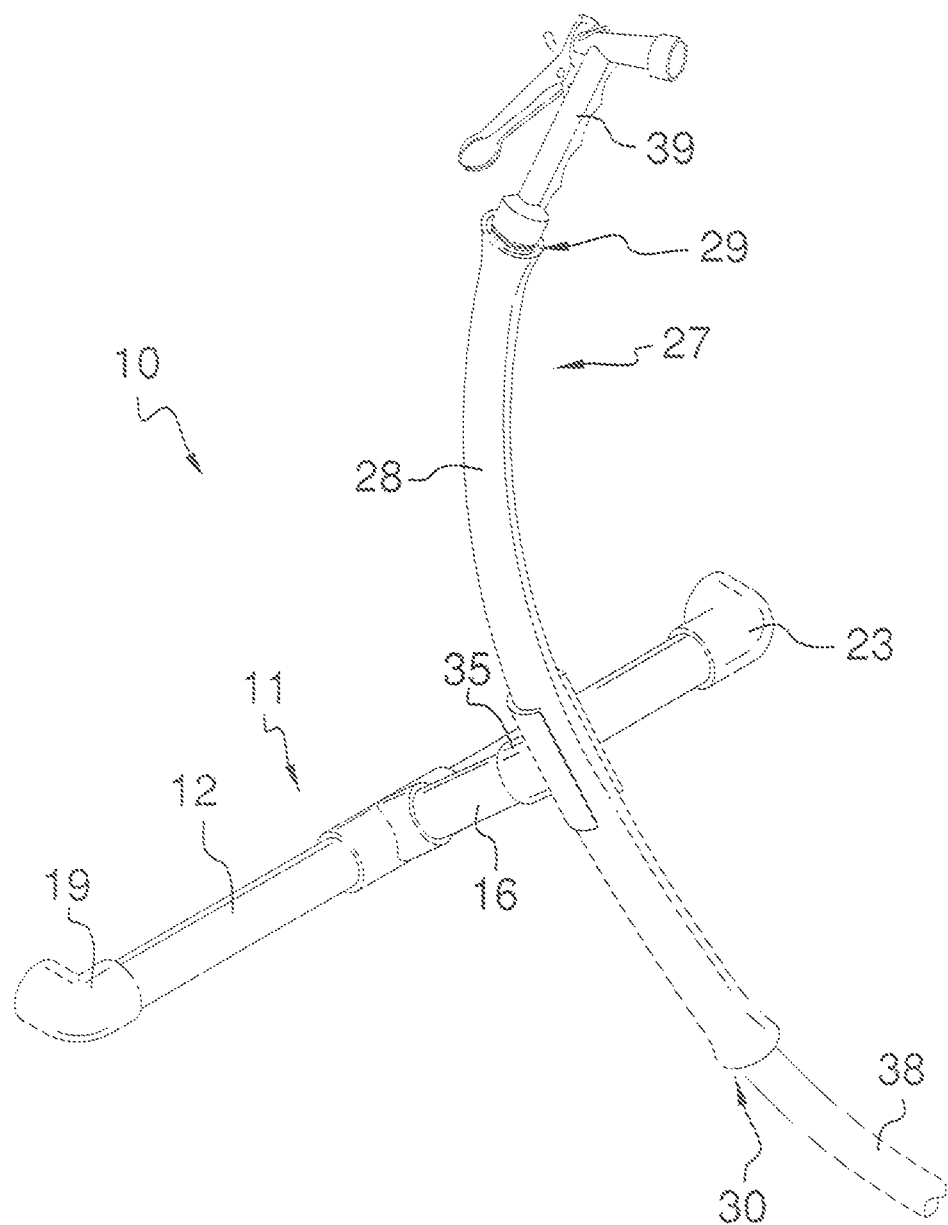
FIG. 3 is a perspective view of a second embodiment of the present invention.

With reference now to the drawings, and in particular to FIGS. 1 through 3 thereof, a new water hose support device embodying the principles and concepts of the present invention and generally designated by the reference numeral 10 will be described.

As best illustrated in FIGS. 1 through 3, the water hose support device 10 may generally comprise a rigid base assembly 11 and a hose support assembly 27 including a rigid elongate tubular member 28 made of any suitable material and having open top 29 and bottom ends 30 and a bore 40 extending therethrough with the elongate tubular member 28 rotatably mounted upon the base assembly 11 and adapted to removably receive and support a water hose 38 therethrough. The base assembly 11 may include a rigid elongate base member 12 with opposed ends 13, 14 and a rigid elongate support member 16 conventionally and integrally attached to the elongate base member 12. The elongate support member 16 may have a proximate end 17 conventionally attached to an intermediate portion 15 of the elongate base member 12 and may also have a distal end 18 with the elongate support member 16 having a longitudinal axis disposed perpendicular to a longitudinal axis of the elongate base member 12. The base assembly 11 may further include rigid stabilizing members 19, 23 removably engaged about the opposed ends 13, 14 of the elongate base member 12 to prevent rotational movement of the elongate base member 12 during the use thereof. Each of the stabilizing members 13, 14 may have a proximate portion 20, 24 with an open end 21, 25 and with a respective one of the opposed ends 13, 14 of the elongate base member 12 removably engaged in the open end 21, 25, and may also have a distal portion 22, 26 angled relative to the proximate portion 20, 24 and having a longitudinal axis disposed perpendicular to the longitudinal axis of the elongate base member 12 to stabilize the elongate base member 12 upon a surface.

As illustrated in FIGS. 1 through 3, the elongate tubular member 28 may have an intermediate portion 31 spaced from the top and bottom ends 29, 30 and is curved, bowed and concaved along a length thereof with the top end 29 disposed in vertical alignment with the intermediate portion 31 of the elongate tubular member 28 when the elongate tubular member 28 is supported upon a horizontal surface. The elongate tubular member 28 may further have top and bottom end portions 33, 34 at the open top and bottom ends 29, 30 with the top and bottom end portions 33, 34 flared outwardly from the elongate tubular member 28 to prevent snagging of the water hose 38 in the elongate tubular member 28. The elongate tubular member 28 may have a convex surface 32, wherein the hose support assembly 27 may further include a coupler 35 conventionally and integrally attached to the convex surface 32 and to the intermediate portion 31 of the elongate tubular member 28. The coupler 35 may extend outwardly from the elongate tubular member 28 and may have an outer end 36 with a slot 37 disposed therein. The distal end 18 of the elongate support member 16 may be removably engaged in the slot 37 of the coupler 36 to support the elongate tubular member 28 with the elongate tubular member 28 being rotatable relative to the elongate support member 16 and the elongate base member 12.

In use, the water hose 38 may be extended through the bore 40 of the elongate tubular member 28 with an end of the water hose 38 extending from the open top end of the elongate tubular member 28 and with the water hose 38 conventionally connected to a water source such as a spigot. A nozzle 39 may be conventionally connected to the end of the water hose 38. The water hose 38 with water from the water source is used to do various things such as washing a vehicle, watering plants or even for kids to run through water spraying from the nozzle 39. The base assembly 11 may be positioned upon a surface with the nozzle 39 elevated above the surface and within reach of an upright standing user without the user having to stoop over to access the nozzle 39. The elongate tubular member 28 may also be rotated relative to the base assembly 11 in furtherance of using the water hose 38 and the water. The entire water hose support device 10 may be picked and moved about as desired.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the water hose support device. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A water hose support device comprising:
   a base assembly including a rigid elongate base member with opposed ends and a longitudinal axis and including a rigid elongate support member attached to the elongate base member, wherein the base assembly further includes stabilizing members removably engaged about the opposed ends of the elongate base member to prevent rotational movement of the elongate base member during the use thereof; and
   a hose support assembly including a rigid elongate tubular member having open top and bottom ends and a bore extending therethrough with the elongate tubular member rotatably mounted upon the base assembly and adapted to removably receive and support a water hose therethrough.

2. The water hose support device as described in claim 1, wherein each of the stabilizing members has a proximate portion with an open end and with a respective one of the opposed ends of the elongate base member removably engaged in the open end, and also has a distal portion angled relative to the proximate portion and having a longitudinal axis disposed perpendicular to the longitudinal axis of the elongate base member to stabilize the elongate base member upon a surface.

3. A water hose support device comprising:
   a base assembly including a rigid elongate base member with opposed ends and a longitudinal axis and including a rigid elongate support member attached to the elongate base member; and
   a hose support assembly including a rigid elongate tubular member having open top and bottom ends and a bore extending therethrough with the elongate tubular member rotatably mounted upon the base assembly and adapted to removably receive and support a water hose therethrough, wherein elongate tubular member has top and bottom end portions at the open top and bottom ends with the top and bottom end portions flared outwardly from the elongate tubular member to prevent snagging of the water hose in the elongate tubular member.

* * * * *